US006752435B1

(12) United States Patent
Sorkin

(10) Patent No.: US 6,752,435 B1
(45) Date of Patent: Jun. 22, 2004

(54) SYMMETRICAL COUPLER APPARATUS FOR USE WITH PRECAST CONCRETE SEGMENTAL CONSTRUCTION

(76) Inventor: Felix L. Sorkin, 13022 Trinity Dr., Stafford, TX (US) 77477

( * ) Notice: Subject to any disclaimer, the term of this patent is extended or adjusted under 35 U.S.C. 154(b) by 37 days.

(21) Appl. No.: 10/139,798

(22) Filed: May 7, 2002

(51) Int. Cl.$^7$ .............................. F16L 37/18; E04C 3/26
(52) U.S. Cl. ......................... 285/230; 285/336; 52/228; 405/259.1
(58) Field of Search ............................... 285/230, 336, 285/903; 52/726.1, 740.1, 252; 403/305, 296, 267

(56) References Cited

U.S. PATENT DOCUMENTS

| | | | | |
|---|---|---|---|---|
| 1,385,606 A | * | 7/1921 | Christensen | 52/223.13 |
| 2,789,844 A | * | 4/1957 | Kessler | 285/336 |
| 3,585,771 A | * | 6/1971 | Pinniger | 52/251 |
| 3,691,708 A | * | 9/1972 | Firnkas | 52/470 |
| 3,765,707 A | * | 10/1973 | Westberg | 285/336 |
| 4,202,568 A | * | 5/1980 | Strom | 285/336 |
| 4,900,063 A | * | 2/1990 | Baarfusser et al. | 285/24 |
| 4,900,193 A | * | 2/1990 | MacKinnon | 405/252 |
| 5,231,936 A | | 8/1993 | Kikuchi et al. | |
| 5,437,072 A | * | 8/1995 | Dinis et al. | 14/73 |
| 5,474,335 A | | 12/1995 | Sorkin | |
| 5,478,123 A | * | 12/1995 | Kanao | 285/291.1 |
| 5,775,849 A | * | 7/1998 | Sorkin | 405/259.1 |
| D400,670 S | | 11/1998 | Sorkin | |
| 5,954,373 A | | 9/1999 | Sorkin | |
| 6,151,850 A | * | 11/2000 | Sorkin | 52/223.13 |

* cited by examiner

Primary Examiner—Eric K. Nicholson
(74) Attorney, Agent, or Firm—Harrison & Egbert

(57) ABSTRACT

A coupler member for use with concrete segments having a first duct, a first coupler member extending over and around an exterior surface of the first duct and having an end opening adjacent an end of the first duct, a second duct, a second coupler member extending over and around an exterior surface of the second duct and an end opening adjacent to an end of the second duct, and a gasket received in the ends of the first and second coupler members. The gasket serves to prevent liquid from passing between the ends of the coupler members into an interior of either of the first and second ducts. An external seal is affixed to an opposite end of the first coupler member and affixed to an exterior surface of the first duct. An internal seal is interposed in generally liquid-tight relationship between an interior surface of the second coupler member and an exterior surface of the second duct. The ends of the first and second coupler members are generally V-shaped grooves facing one-another. The gasket is received within these V-shaped grooves.

24 Claims, 5 Drawing Sheets

SYMMETRICAL COUPLER APPARATUS FOR USE WITH PRECAST CONCRETE SEGMENTAL CONSTRUCTION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to the assembly and installation of precast concrete segments used in construction activities, such as bridge and highway construction. More particularly, the present invention relates to couplers for joining the ends of interior ducts of such precast concrete segments in end-to-end liquid-tight relationship.

DESCRIPTION OF THE PRIOR ART

Precast segmental bridges are known and commonly used throughout the world as a means to forge roadways through mountainous terrain or across rivers or other barriers. Such bridges are typically constructed in accordance with the following sequence: First, a series of upright piers are formed along the bridge span. Thereafter, cantilevered bridge section are built out of each pier by successively mounting the precast segments to previously completed bridge components and post-tensioning the segments thereto. The cantilevered bridge sections are built out from each pier in a symmetrical fashion so that the piers are not subjected to undue bending loads. When the cantilevered sections are complete, the ends thereof are post-tensioned together to form a continuous bridge deck. Typically, two such bridge spans are constructed to accommodate the two directions of travel. These spans are generally side-by-side, but need not be parallel (horizontally or vertically) nor at the same elevation.

FIGS. 1–4 illustrate a form of such precast segmental bridge construction in accordance with the teachings of U.S. Pat. No. 5,231,931, isssued on Aug. 3, 1993 to G. Sauvagiot. This form of segmental precast bridge construction is particularly disclosed as used with a rapid transit viaduct system.

Referring to FIG. 1, a rapid transit viaduct section two includes a central load bearing span or body member 4 supported by a pair of upright pier members 6 and 8. Extending laterally from opposite lower side portions of the central body 4 are a pair of lateral platform structures 10 and 12. Each of the platform structures 10 and 12 has a pair of rails 14 mounted thereon for carrying a rapid transit vehicle. In addition, each of the platform sections may be provided with an upright sidewall section 16 as required for safety, noise pollution and other considerations. One or more sets of rails 14 are carried by each of the lateral platform structures depending on the requirements of the transit systems.

The platform structures 10 and 12 each include respective upper platform decks and respective lower support struts 22 and 24. The lower support struts 22 and 24 are mounted as close to the bottom of the central load bearing body 4 as practicable. Deck members 18 and 20 are mounted to the central body 4 at an intermediate portion thereof above the support struts 22 and 24. The support struts angle upwardly from their point of attachment with the load bearing body 4 until they intersect the deck members. As such, the deck members 18 and 20 and support struts 22 and 24 form a box section providing resistance to torsional loading caused by track curvature and differential train loading. This box section may be considered a closed base. The load bearing body 4 bisects the closed base and extends vertically upwardly therefrom to provide span-wise bending resistance. Preferably, the entire duct section 2 is cast as a single reinforced concrete cross-section.

The platform sections 10 and 12 each include lower pier mounts 26 and 28. These are mounted respectively to the bottom of the support structures 22 and 24. The pier mounts 26 and 28 are, in turn, supported, respectively, on the piers 6 and 8 using a plurality of neoprene pads 30, which provide a cushioned support for the structure.

As shown in FIG. 1, the viaduct section 2 forms part of a viaduct system supporting rails 14 for carrying rapid transit vehicles 32 and 34. The viaduct section 2 may be formed as a precast modular segment. The viaduct section 2 is then combined with other viaduct sections to form a precast segmental structure. To facilitate such construction, the load bearing body 4 may be formed with interlock member 36, while the lateral platform structures 10 and 12 may be each formed with interlock members 38.

Referring to FIG. 2, a viaduct system is formed from a plurality of precast sections 2 formed as modular segments and combined as a precast segmental structure extending between sequentially positioned piers (not shown). The sections 2 are placed in longitudinally abutting relationship. To facilitate that construction, the sections are match cast so that the abutting end portions thereof fit one another in an intimate interlocking relationship. Each successive section is therefor cast against a previously cast adjacent section to assure interface continuity.

The connection between adjacent modular sections is further secured by way of the interlock members 36 and 38. On one end of each section 2, the interlock members 36 and 38 are formed as external keys. On the opposite end of each section 2, the interlock members are formed as an internal slot or notch, corresponding to the key members of the adjacent viaduct system. Match casting assures that corresponding keys and slots, as well as the remaining interface surfaces, properly fit one another.

As seen in FIG. 2, the sections 2 are bound together with one or more post-tensioning cables or tendons 40, 42 and 44. The number of cables used will depend on a number of factors such as cable thickness, span length and loading requirements. The tensioning cables are each routed along a predetermined path which varies in vertical or lateral position along the span of the segmental structure.

FIG. 3 illustrates, diagrammatically, the manner in which the post-tensioning cables 40, 42 and 44 extend through the concrete structure of the spans. As can be seen in FIG. 3, the post-tensioning cables are sometimes positioned within the concrete segment themselves, and at other times are positioned externally thereof.

It is important to note that multiple post-tension cables are often used as extending through ducts within the concrete structure. In FIG. 4, it can be seen that the sections 2 are formed with appropriate guide ducts 50 at locations where the post-tensioning cables passed through the structure. The post-tensioning cable identified collectively by reference numeral 52 in FIG. 4, are routed through the guide ducts 50. To facilitate this routing, a continuous flexible conduit 54 is initially inserted through the guide ducts, and the post-tensioning cables 52 are thereafter placed in the conduit. The conduit 54 may advantageously be formed from polyethylene pipe but could also be formed from flexible metallic materials. The post-tensioning cables 52 are tensioned using conventional post-tensioning apparatus and the interior of the conduit 54 is cement grouted along the entire length thereof for corrosion protection.

One form of duct that is commercially available is shown in FIG. 5. The corrugated polymeric duct 56 is of a type presently manufactured by General Technologies, Inc. of Stafford, Tex., licensee of the present inventor. As can be see in FIG. 5, duct 56 has a plurality of corrugations 58 extending radially outwardly from the generally tubular body 60. The duct 56 has ends 62 and 64 through which post-tensioning cables can emerge. In FIG. 5, it can be seen that there are longitudinal channels 66, 68 and 70 extending along the outer surface of the tubular body 60. The longitudinal channels 66, 68 and 70 allow any grout that is introduced into the interior of the duct 56 to flow easily and fully through the interior of the duct 56. The longitudinal channels 66, 68 and 70 also add structural integrity to the length of the duct 56. It is important to realize that the duct 56 can be formed of a suitable length so as to extend fully through one of the segments 2 as used in a precast segmental structure.

Unfortunately, when such ducts, such as duct 56, are used in such precast segmental construction, it is difficult to seal the ends 62 and 64 of each duct to the corresponding duct of an adjacent section of the segmental structure. Conventionally, the segments are joined together in end-to-end relationship through the application of an epoxy material to the matching surfaces of the structure. Under such circumstances, it is very common for the epoxy to flow or to become extruded into the opening at the ends 62 and 64 of the duct when the segments are connected in end-to-end relationship. In other circumstances, a grout is pumped through the interior passageway of the duct 56 so as to offer a seal against the intrusion of air and water into the interior of the duct 56. The grout is pumped through the interior of the ducts. Unfortunately, if there is an incomplete connection between the duct 56 and the duct of an adjoining segment of the segmental structure, then the epoxy will leak out into the interface area between the segments and will not flow fully through the entire duct assembly. Once again, an incomplete grouting of the interior of the duct 56 may occur.

It is important to note that in such precast concrete segmental construction, the concrete will slightly warp when matched with the adjoining section. Even though match casting is employed, the lack of homogeneity in the concrete mixtures used for the adjoining sections can cause a misalignment between matching sections. A great deal of tolerance must maintained when a coupler is developed so that any warping or distortion in the surfaces of the matching segments can be accommodated.

The ability to avoid air and liquid intrusion into the interior of the duct 56 is very important in such multi-strand, precast concrete segmental structures. As can be seen in FIG. 1, since the structure is often used on bridges or elevated structures, the post-tensioning cables can be subject to a great deal of exposure from the elements. For example, if the bridge structure is associated with roads traveled by motor vehicles, then there is often the application of salt onto the highway. This salt, when dissolved in water, can leach through the area between the structure segments into the ducts and deteriorate the post-tensioning cables over time. As the post-tensioning cables become corroded, over time, they can weaken so as to potentially cause the failure of the segmental structure. Past experience with such structures has shown that the primary area of leakage would be through those crack formed between those matched segments. As such, it is particularly important to provide a coupler for use in association with the plastic ducts which will effectively prevent any liquid intrusion from entering the area interior of the ducts and adjacent to the post-tensioning cables.

It is an object of the present invention to provide a coupler apparatus which allows for the coupling of multi-tendon ducts in precast segmental concrete structures.

It is another object of the present invention to provide a coupler apparatus which automatically adjusts for any misalignments or warpage in the matching concrete segments.

It is another object of the present invention to provide a coupler apparatus which assures a seal between the coupler and the connected duct.

It is still a further object of the present invention to provide a coupler apparatus which is easy to install, easy to use and easy to manufacture.

It is still a further object of the present invention to provide a coupler apparatus which effectively prevents the intrusion of an epoxy into the interior of the duct during the sealing of one structural segment to another structural segment.

It is a further object of the present invention to provide a symmetrical duct coupler which facilitates the ability to manufacture and install the components thereof.

These and other objects of the present invention will become apparent from a reading of the attached specification and appended claims.

SUMMARY OF THE INVENTION

A coupler apparatus for use with precast concrete segments comprising a first duct having an end and an exterior surface, a first coupler member extending over and around the exterior surface of the first duct and having an end opening adjacent to an end of the first duct, a second duct having an end and an exterior surface, a second coupler member extending over and around the exterior surface of the second duct and having an opening adjacent to the end of the second duct, and a gasket received in the end of the first coupler member and in the end of the second coupler member. The gasket serves to prevent liquid from passing between the ends of the coupler members into an interior of either of the first and second ducts. The first duct and the first coupler are embedded in a first concrete segment. The second duct and the second coupler member are embedded in a second concrete segment. The end of the first coupler member faces the end of the second coupler member.

An external seal is affixed in generally liquid-tight relationship to an opposite end of the first coupler member and is also affixed to the exterior surface of the first duct. This external seal is formed of an annular heat shrink material. This external seal is in compressive contact with the exterior surface of the first coupler member and with the exterior surface of the first duct.

An internal seal is interposed in generally liquid-tight relationship between an interior surface of the second coupler member and an exterior surface of the second duct. This internal seal is an annular ring of an elastomeric material positioned so as to allow relative movement between the second coupler member and the second duct while maintaining the liquid-tight relationship therebetween.

The end of the first coupler member has a generally V-shaped groove with an opening facing the second coupler member. Similarly, the second coupler member has a generally V-shaped groove with an opening facing the first coupler member. The gasket is fitted in the V-shaped groove of at least one of the first and second coupler members. The end of the first coupler member is in abutment with an end of the first duct. Similarly, the end of the second coupler member has a surface in abutment with the end of the second duct. The gasket is an elastomeric ring having a cross-sectional thickness greater than a depth of either of the V-shaped grooves of the first and second coupler members.

In the present invention, the first duct, the second duct, the first coupler member and the second coupler member are each formed of a polymeric material.

DETAILED DESCRIPTION OF THE INVENTION

Figure 6:
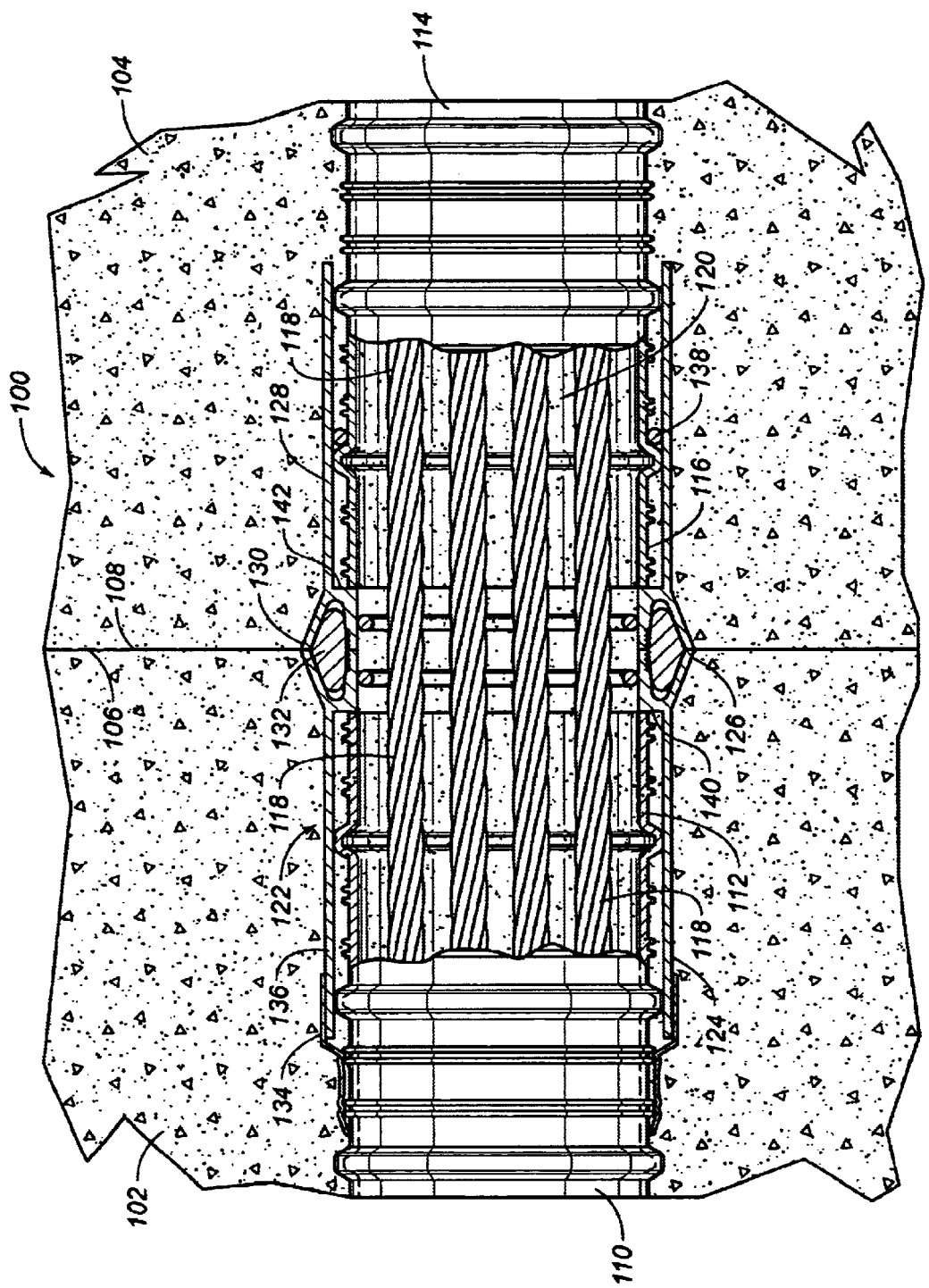
FIG. 6 is a cross-sectional view showing the coupler assembly as used in the precast concrete segmental structure of the present invention.

Referring to FIG. 6, there is shown at 100 the precast concrete segmental structure in accordance with the teachings of the present invention. The structure 100 includes a first concrete segment 102 and a second concrete segment 104. The first concrete segment 102 has an outer surface 106 which is joined in surface-to surface contact with the inner surface 108 of the concrete segment 104. The segments 102 and 104 are formed by match casting, as described hereinbefore.

Figure 1:
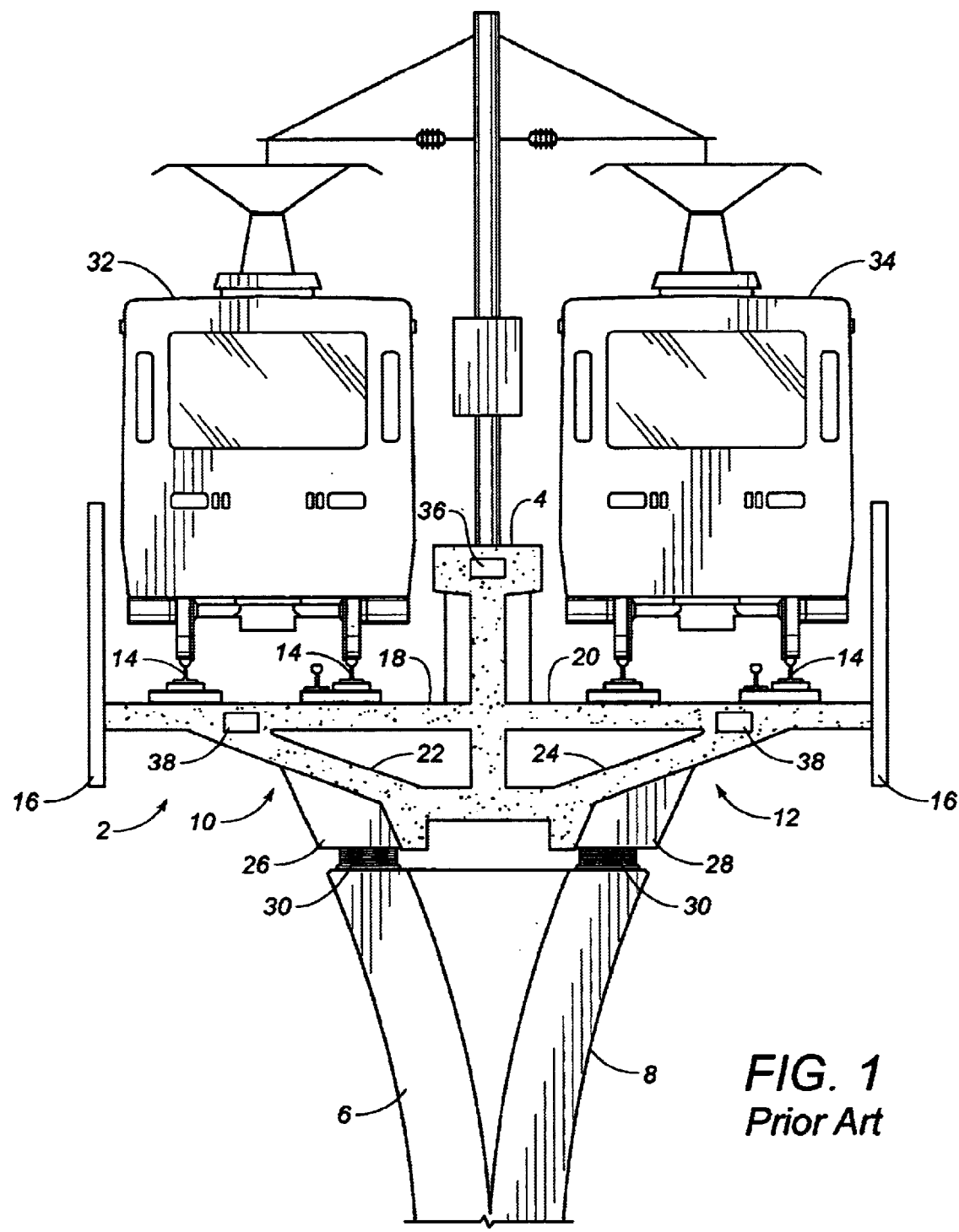
FIG. 1 is a diagrammatic view showing a cross-section of a rapid transit viaduct structure employing a prior art precast segmental structure.
Figure 2:
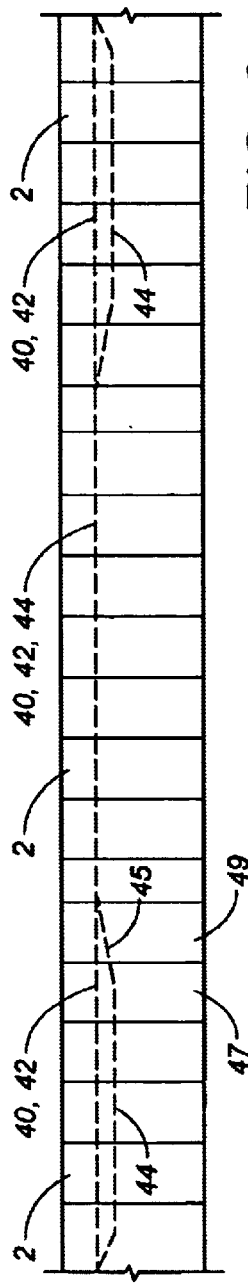
FIG. 2 is a partially diagrammatic view showing a cross-section indicating the assemblage of the concrete segments of the structure of FIG. 1 and showing, in particular, the alignment of the post-tensioning cables.
Figure 3:
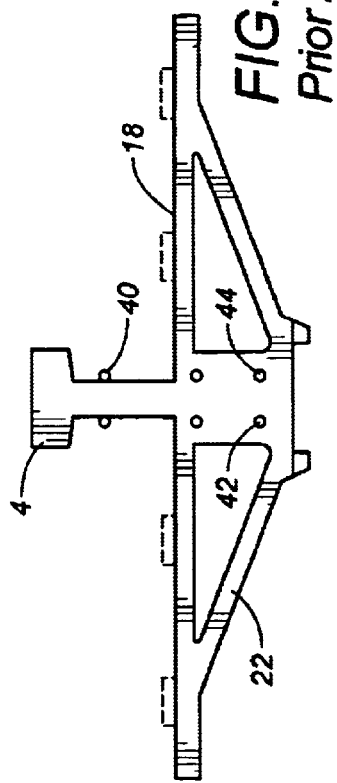
FIG. 3 is an end view of a precast concrete segment, and the associated post-tension cables, of the prior art structure if FIG. 1.
Figure 4:
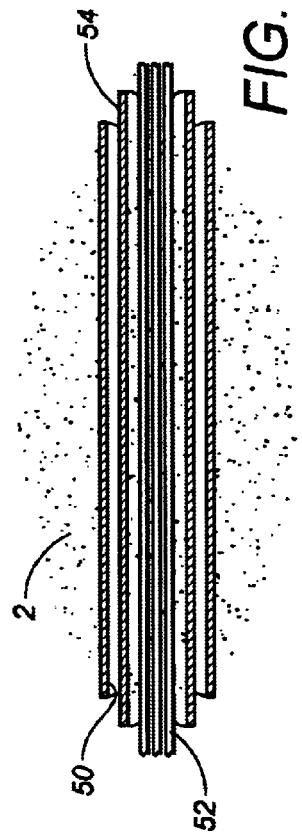
FIG. 4 is a diagrammatic cross-sectional view showing the prior art techniques for the routing of a cable through the duct associated with the concrete segment.
Figure 5:
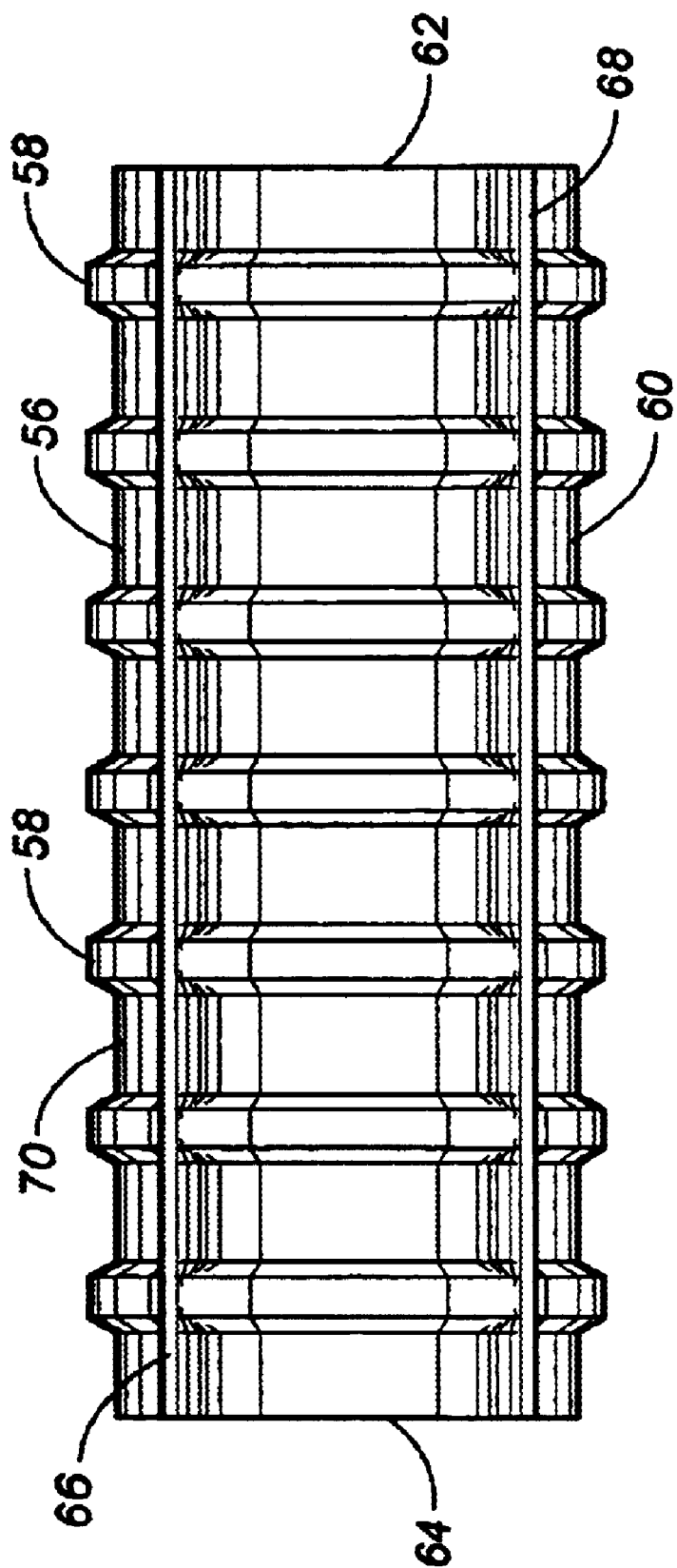
FIG. 5 is a side elevational view of a prior art multi-cable duct as used in the present invention.

Importantly, a first duct 110 is embedded in the first concrete structure 102. Duct 110 has a construction similar to that shown in FIG. 5, or similar to other multi-cable ducts. The first duct 110 has an end 112 generally adjacent to the exterior surface 106 of the concrete segment 102. Similarly, a second duct 114 is embedded in the second concrete segment 104. The second duct 114 has a configuration similar to that of duct 110. Duct 114 has an end 116 generally adjacent to the inner surface 108 of concrete segment 104. Each of the duct 110 and 114 are embedded in the respective concrete segments 102 and 104 so as to be generally longitudinally aligned. The duct 110 has an interior passageway which will be axially aligned with the interior passageway of duct 114.

As can be see in FIG. 6, a plurality of tendons 118 extend longitudinally through the interior passageways of the ducts 110 and 114. In FIG. 6, these tendons 118 are properly post-tensioned in a conventional manner. A grouting material 120 is introduced through the interior passageways 110 and 114 to further cement and seal the interior of the ducts 110 and 114 around the tendons 118. The grouting material, in combination with the polymeric material of the ducts 110 and 114, serves to avoid the adverse effects of liquid intrusion into the tendons 118. The present invention utilizes a unique coupler apparatus 122 which further assures the avoidance of liquid intrusion through the space between the exterior surface 106 of concrete segment 102 and the inner surface 108 of concrete segment 104. A first coupler member 124 extends over and around the exterior surface of the first duct 110. The first coupler member 124 has an end 126 opening at the exterior surface 106 of concrete segment 102. Similarly, the end 126 of the coupler member 124 is generally forward of, but adjacent to, the end 112 of first duct 110. A second coupler member 128 extends over and around the exterior surface of the second duct 114. The second coupler member 128 has an end 130 opening at the inner surface 108 of concrete segment 104. End 130 is slightly forward of the end 116 of the duct 114. A gasket 132 is received in the ends 126 and 130 of the respective coupler members 124 and 128. The gasket 132 is particularly designed to prevent liquid from passing between the ends 126 and 130 of the respective coupler members 124 and 128 into the interior of the ducts 110 and 114. The coupler members 124 and 128 have an identical configuration to each other. This serves to minimize the manufacturing requirements since only a single mold is required for each of the coupler members. Also, installation is easy since unskilled workers can install the first and second coupler members without regard to the configuration of a particular coupler member.

An external seal 134 is affixed in generally liquid-tight relationship to an opposite end 136 of the first coupler member 124 and is also affixed to an exterior surface of the first duct 110. In particular, the external seal 134 is formed of an elastomeric sleeve or an annular heat shrink material. The external seal 134 will be in compressive liquid-tight contact with the exterior surface of the first coupler member 124 and with the exterior surface of the duct 110. Prior to embedding the coupler member 124 into the concrete associated with the concrete segment 102, the coupler member 124 can be affixed in liquid-tight relationship by applying heat to the exterior surface of the external seal 134. As a result, the heat-shrink material of the external seal 134 will tightly engage the surfaces of the coupler member 124 and also the exterior surfaces of the duct 110. As a result, the exterior surface 134 will prevent liquid intrusion through the opposite end 136 of the coupler member 124.

An internal seal 138 in interposed in generally liquid-tight relationship between the interior surface of the second coupler member 128 and the exterior surface of the second duct 114. This internal seal 138 is a generally-annular ring formed of an elastomeric material. The internal seal 138 is positioned to allow relative movement between the second coupler member 128 and the second duct 114 while maintaining the liquid-tight relationship between the coupler member 128 and the duct 114. The ability to allow relative movement between the coupler member 128 and the duct 114 is important because of the "match casting" used for the formation of the second concrete segment 104. If there is any warping or inconsistent relationship between the surfaces 106 and 108, the second coupler member 128 will be able to relatively move with respect to the exterior surfaces of the duct 114 to adjust for such warping or inconsistencies. The second coupler member is also moveable in relation to any expansion or contraction of the concrete segments 102 and 104. This can be done without affecting the liquid-tight environment between the coupler member 128 and the duct 114.

In FIG. 6, it can be seen that the end 126 of the first coupler member 124 has a generally V-shaped groove facing the second coupler member 128. In particular, it is the opening of this V-shaped groove which faces the second coupler member 128. Similarly, the end 130 is a V-shaped groove which faces the V-shaped groove of the end 126. It can be seen that the gasket 132 is fitted into the V-shaped groove at one of the ends 126 and 130 or into both of the ends 126 and 130.

So as to further assure the avoidance of any liquid intrusion, it can be seen that the end 126 of the first coupler member 124 has a surface 140 which is in abutment with the end 112 of the first duct 110. Similarly, the, second coupler member 128 has a surface 142 which is in abutment with the end 116 of the second duct 114. This relationship further assures the accurate placement of the coupler members in end-to-end relationship and further assures the alignment of the ducts 110 and 114.

As can be seen in FIG. 6, the gasket 132 is an elastomeric ring having a crosssectional thickness greater than a depth of either of the V-shaped grooves of the respective ends 126 and 130 of the coupler members 124 and 128. As a result, the elastomeric ring of the gasket 132 will effectively "fill" the outer portions of the V-shaped grooves. The configuration of the V-shaped grooves causes the elastomeric material of the gasket 132 to "extrude" thereinto so as to establish a tight sealing relationship therewith.

Importantly, the present invention is of relatively low cost. The first duct 110, the second duct 114, the first coupler member 124 and the second coupler member 128 are formed of a polymeric material. Each of these components can be formed in an injection molding process Similarly, the gasket 132 can be formed of an elastomeric or other resilient material. The material used for the gasket 132 should be suitably hydrophobic so as to resist any liquid intrusion.

Figure 7:
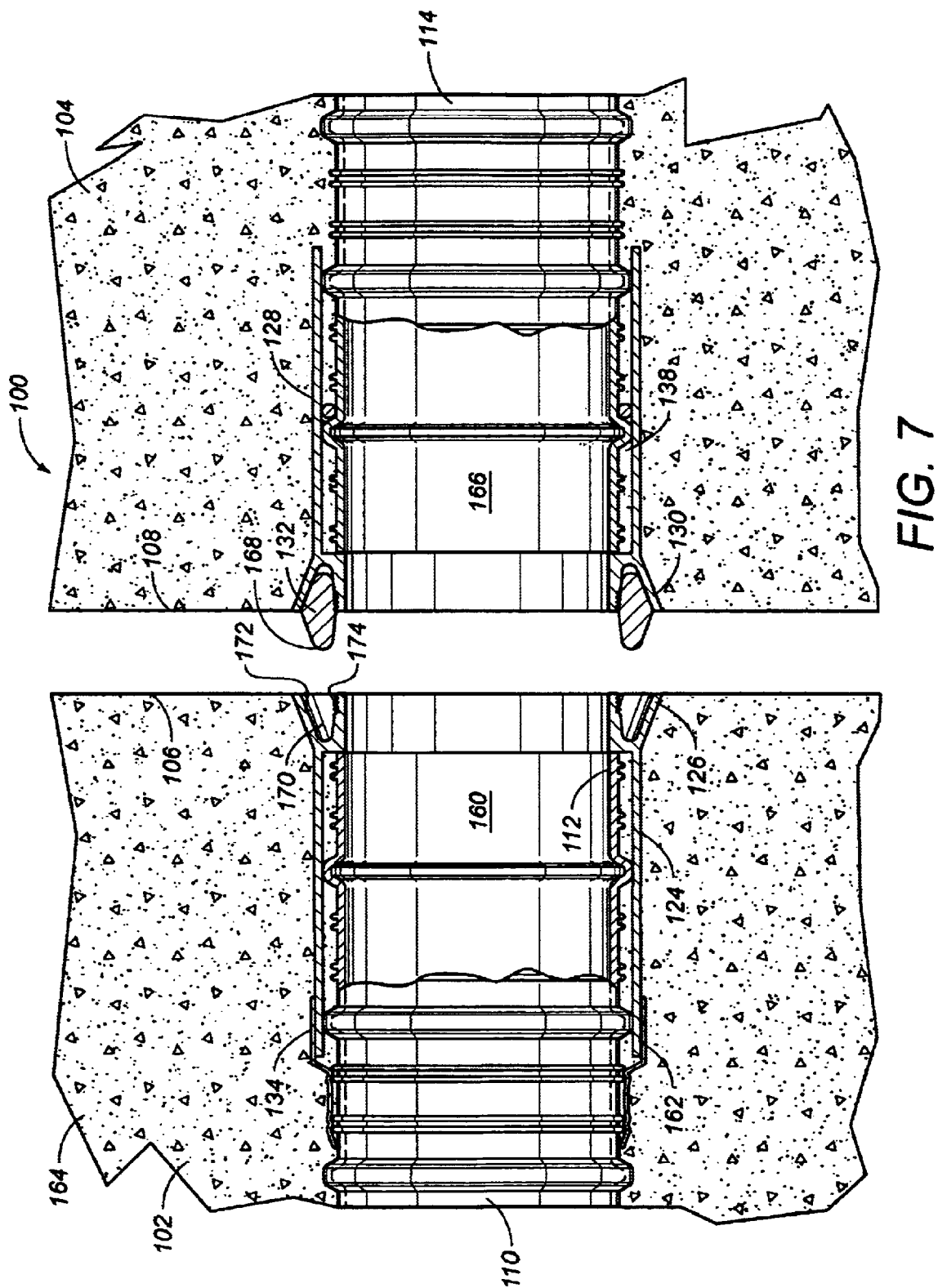
FIG. 7 is a cross-sectional view showing the assembly of the coupler apparatus of the present invention.

FIG. 7 is an illustration of the apparatus 100 of the present invention prior to the installation of the tendons 118 and the installation of the grout 120. In particular, FIG. 7 shows the initial assembly of the components of the present invention.

In the present invention, the first duct 110 is suitably mounted against a metal bulkhead having a flat surface corresponding to the formation of the exterior surface 106 of concrete segment 102. A suitable fixture is provided on the metal bulkhead which will extend into the interior 160 of the first duct 110. Prior to the installation of the first duct 110 onto the bulkhead fixture, the coupler member 124 is placed over the exterior surface of the first duct 110. Similarly, the external seal 134 is placed over the end 162 of the coupler member 124 opposite the end 126. A suitable heating device, such as a hot air blower, can be applied to the external seal 134 so as to heat shrink the seal 134 upon the exterior surface of the duct 110 and upon the exterior surface of the first coupler member 124. Once the duct 110, along with the attached coupler member 124 is placed upon the bulkhead fixture, the concrete 164 can then be poured into a suitable mold. After solidifying, the metal bulkhead, and the attached bulkhead fixture are removed from the surface 106 so as to create a flat surface thereagainst. Upon solidification, the inner surface 108 of the concrete segment 104 will be formed by match casting. In other words, the surface 106 will act as a surface for the formation of surface 108. A suitable mandrel or alignment plug can be placed into the interior passageway 160 of the first duct 110. This alignment plug can extend outwardly beyond the surface 106. The second coupler member 128 can then be applied onto the exterior surface of the second duct 114. The internal seal 138 is interposed between the inner surface of the second coupler member 128 and the exterior surface of the duct 114. The second duct 114 and its associated coupler 128 can then be placed over the alignment plug extending outwardly of the interior passageway 160 of the duct 110 so as to extend into the interior passageway 166 of the second duct 114. Since there is a possibility of slight misalignment during the formation of the second concrete segment 104, the second coupler member 128 is slidable relative to the duct 114 by virtue of the "rollability" of the internal seal 138.

After the concrete solidifies, the surface 108 will be separated from surface 106. Similarly, the end 130 of the coupler member 128 will be separated from the end 126 of the coupler 124. The gasket 132 can then be installed into the V-shaped groove associated with the end 130 of the second coupler 128. Because of the enlarged cross-sectional area of the annular gasket 132, a portion of the gasket 132 will extend outwardly beyond the end 130 of the second coupler member 128.

The segment 102 can then be installed as part of the segmental structure. The segment 104 is then transported into position so that the surface 108 will face the surface 106. Since it is possible that a misalignment of the surface of the segments can occur, the particular arrangement of the V-shaped grooves and the shape of the gasket 132 will accommodate any misalignment. When the surface 108 is brought into proximity against the surface 106, the relatively pointed side 168 of the gasket 132 will "funnel" into the V-shaped groove 170 at the end 126 of the first coupler member 124. Particularly, the pointed side 168 may contact either side 172 or 174 of the V-shaped groove 170. As the surface 108 is brought further into proximity with surface 106, the gasket 132 will extrude into the V-shaped groove 170 so as to establish an effective liquid-tight seal therewith. After assembling and epoxying of the surfaces 106 and 108 together, tendons can be extended through the interior passageways 160 and 166 of the respective ducts 110 and 114 so as to permanently join the segments 102 and 104 in post-tensioned relationship.

Importantly, as can be seen in FIG. 6, the use of the unique configuration of the gasket 132, along with V-shaped groove 170, will avoid any intrusion of epoxy into the interior passageways 160 and 166. The gasket 132 will block the extruded epoxy from flowing in an undesired manner into the interior passageways 160 and 166. In a similar manner, the gasket 132 will also prevent any liquid intrusion from passing into these interior passageways. The compressive relationship between the V-shaped grooves associated with the coupler members 124 and 128 establishes a strong sealing bond between the coupler members which will be resistive to the elements over an extended period of time. Subsequent to installation, the grout can be effectively pumped through the interior passageways 160 and 166 without any grout accidentally flowing outwardly of the ducts 110 and 114 in the area of the space between the segments 102 and 104. Secondary liquid intrusion is effectively accomplished through the tight sealing relationship of the external seal 134 and the sliding sealing of the internal seal 138.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A coupler apparatus for use with concrete segments comprising:

a first duct having an end and an exterior surface;

a first coupler member extending over and around said exterior surface of said duct, said first coupler member having an end opening adjacent said and of said first duct;

a second duct having an end and an exterior space;

a second coupler member extending over and around said exterior surface of said second duct, said second coupler member having an end opening adjacent said end of said second duct;

a gasket means received in said end of said first coupler member and said end of said second coupler member, said gasket means for preventing liquid from passing between said ends of said first and second coupler members into an interior of either of said first and second ducts; and an external seal affixed in generally liquid-tight relationship to an opposite end of said first coupler member and affixed to an exterior surface of said first duct.

2. The coupler apparatus of claim 1, said external seal formed of a heat shrink material, said external seal being in compressive contact with an exterior surface of said first coupler member and with said exterior surface of said first duct.

3. A coupler apparatus for use with concrete segments comprising:

a first duct having an end and an exterior surface;

a first coupler member extending over and around said exterior surface of said duct, said first coupler member having an end opening adjacent said end of said first duct;

a second duct having an end and an exterior surface;

a second coupler member extending over and around said exterior surface of said second duct, said second coupler member having an end opening adjacent said end of said second duct;

a gasket means received in said end of said first coupler member and said end of said second coupler member, said gasket means for preventing liquid from passing between said ends of said first and second coupler members into an interior of either of said first and second ducts; and an internal seal interposed in a generally liquid-tight relationship between an interior surface of said second coupler member and said exterior surface of said second duct.

4. The coupler apparatus of claim 3, said internal seal being an annular ring of an elastomeric material positioned so as to allow relative movement between said second coupler member and said second duct while maintaining the liquid-tight relationship therebetween.

5. The coupler apparatus of claim 3, said end of said first coupler member having a generally V-shaped groove facing said second coupler member, said second coupler member having a generally V-shaped groove facing said first coupler member, said gasket means fitted in the V-shaped groove of at least one of said first and second coupler members.

6. The coupler apparatus of claim 5, said end of said first coupler member having a seat with a surface in abutment with said end of said first duct, said end of said second coupler member having a seat with a surface in abutment with said end of said second duct.

7. The coupler apparatus of claim 5, said gasket means being an elastomeric ring having a cross-sectional thickness greater than a depth of either of the V-shaped grooves of said first and second coupler members.

8. The coupler apparatus of claim 3, said first duct and said second duct and said first coupler member and said second coupler member each being formed of a polymeric material.

9. The coupler apparatus of claim 3, said first coupler member having an identical configuration as said second coupler member.

10. A coupler apparatus for use on tendon-receiving ducts of a segmental precast concrete structure comprising:

a first coupler member having an interior passageway suitable for receiving one of the ducts therein, said first coupler member having a generally V-shaped groove at one end thereof;

a second coupler member having an interior passageway suitable for receiving another of the ducts therein, said second coupler member having a generally V-shaped groove at one end thereof, said V-shaped groove of said second coupler member facing said V-shaped groove of said first coupler member;

a gasket member received in at least one of said V-shaped grooves of said first and second coupler members; and an external seal fixed in liquid-tight relationship to an opposite end of said first coupler member and having a portion extending outwardly beyond said opposite end of said first coupler member.

11. The coupler apparatus of claim 10, said gasket member being an annular member having a cross-sectional thickness greater than a depth of one of the V-shaped grooves of said first and second coupler members.

12. The coupler apparatus of claim 10, said external seal being of a heat shrink material, said portion of said external seal suitably positioned for heat sealing onto an external surface of one of the ducts.

13. A coupler apparatus for use on tendon-receiving ducts of a segmental precast concrete structure comprising:

a first coupler member having an interior passageway suitable for receiving one of the ducts therein, said first coupler member having a generally V-shaped groove at one end thereof;

a second coupler member having an interior passageway suitable for receiving another of the ducts therein, said second coupler member having a generally V-shaped groove at one end thereof, said V-shaped groove of said second coupler member facing said V-shaped groove of said first coupler member;

a gasket member received in at least one of said V-shaped grooves of said first and second coupler members; and an internal seal movably positioned against an interior surface of said second coupler member.

14. The coupler apparatus of claim 13, each of said first and second coupler members being of a polymeric material.

15. The coupler apparatus of claim 13, said first and second coupler members having an identical configuration.

16. An apparatus comprising:

a first concrete segment having an outer surface;

a first duct embedded in said first concrete segment and extending therethrough, said first duct having an end adjacent to said outer surface of said first concrete segment;

a first coupler member embedded in said first concrete segment and extending over the first duct, said first coupler member having an end opening at said outer surface of said first concrete segment;

a second concrete segment having an inner surface;

a second duct embedded in said second concrete segment and extending therethrough, said second duct having an end adjacent said inner surface of said second concrete segment;

a second coupler member embedded in said second concrete segment and extending over said second duct, said second coupler member having an end opening at said inner surface of said second concrete segment; and a gasket received in said ends of said first and second coupler members.

17. The apparatus of claim 16, further comprising:

an external seal affixed in generally liquid-tight relationship to an opposite end of said first coupler member and affixed to an exterior surface of said first duct.

18. The apparatus of claim 16, further comprising:

an internal seal interposed in generally liquid-tight relationship between an interior surface of said second coupler member and against an exterior surface of said second duct, said internal seal allowing relative movement between said second coupler member and said second duct while maintaining the liquid-tight relationship therebetween.

19. The apparatus of claim 16, said end of said first coupler member having a generally V-shaped groove facing said second coupler member, said second coupler member having a generally V-shaped groove facing said first coupler member, said gasket fitted in the V-shaped groove of at least one of said first and second coupler members.

20. The apparatus of claim 19, said end of said first coupler member having seat with a surface in abutment with said end of said first duct, said end of said second coupler member having a seat with a surface in abutment with said end of said second duct.

21. The apparatus of claim 19, said gasket being an elastomeric ring having a cross-sectional thickness greater than a depth of either of the V-shaped grooves of said first and second coupler members.

22. The apparatus of claim 19, further comprising:

a plurality of tendons extending through an interior of said first and second ducts, said gasket positioned so as to prevent liquid from passing between said first and second coupler members into said interior of said first and second ducts.

23. The apparatus of claim 22, further comprising:

a grout material filling said interior of said first and second ducts around said plurality of tendons therein.

24. The apparatus of claim 16, said first and second coupler members having an identical configuration.

* * * * *

(12) EX PARTE REEXAMINATION CERTIFICATE (9173rd)
United States Patent
Sorkin

(10) Number: US 6,752,435 C1
(45) Certificate Issued: Aug. 7, 2012

(54) SYMMETRICAL COUPLER APPARATUS FOR USE WITH PRECAST CONCRETE SEGMENTAL CONSTRUCTION

(76) Inventor: Felix L. Sorkin, Stafford, TX (US)

Reexamination Request:
No. 90/011,743, Jun. 24, 2011

Reexamination Certificate for:
Patent No.: 6,752,435
Issued: Jun. 22, 2004
Appl. No.: 10/139,798
Filed: May 7, 2002

(51) Int. Cl.
*F16L 37/18* (2006.01)
*E04C 3/26* (2006.01)

(52) U.S. Cl. .................. 285/230; 285/336; 405/259.1
(58) Field of Classification Search .................. None
See application file for complete search history.

(56) References Cited

To view the complete listing of prior art documents cited during the proceeding for Reexamination Control Number 90/011,743, please refer to the USPTO's public Patent Application Information Retrieval (PAIR) system under the Display References tab.

*Primary Examiner* — Jeffrey R. Jastrzab

(57) ABSTRACT

A coupler member for use with concrete segments having a first duct, a first coupler member extending over and around an exterior surface of the first duct and having an end opening adjacent an end of the first duct, a second duct, a second coupler member extending over and around an exterior surface of the second duct and an end opening adjacent to an end of the second duct, and a gasket received in the ends of the first and second coupler members. The gasket serves to prevent liquid from passing between the ends of the coupler members into an interior of either of the first and second ducts. An external seal is affixed to an opposite end of the first coupler member and affixed to an exterior surface of the first duct. An internal seal is interposed in generally liquid-tight relationship between an interior surface of the second coupler member and an exterior surface of the second duct. The ends of the first and second coupler members are generally V-shaped grooves facing one-another. The gasket is received within these V-shaped grooves.

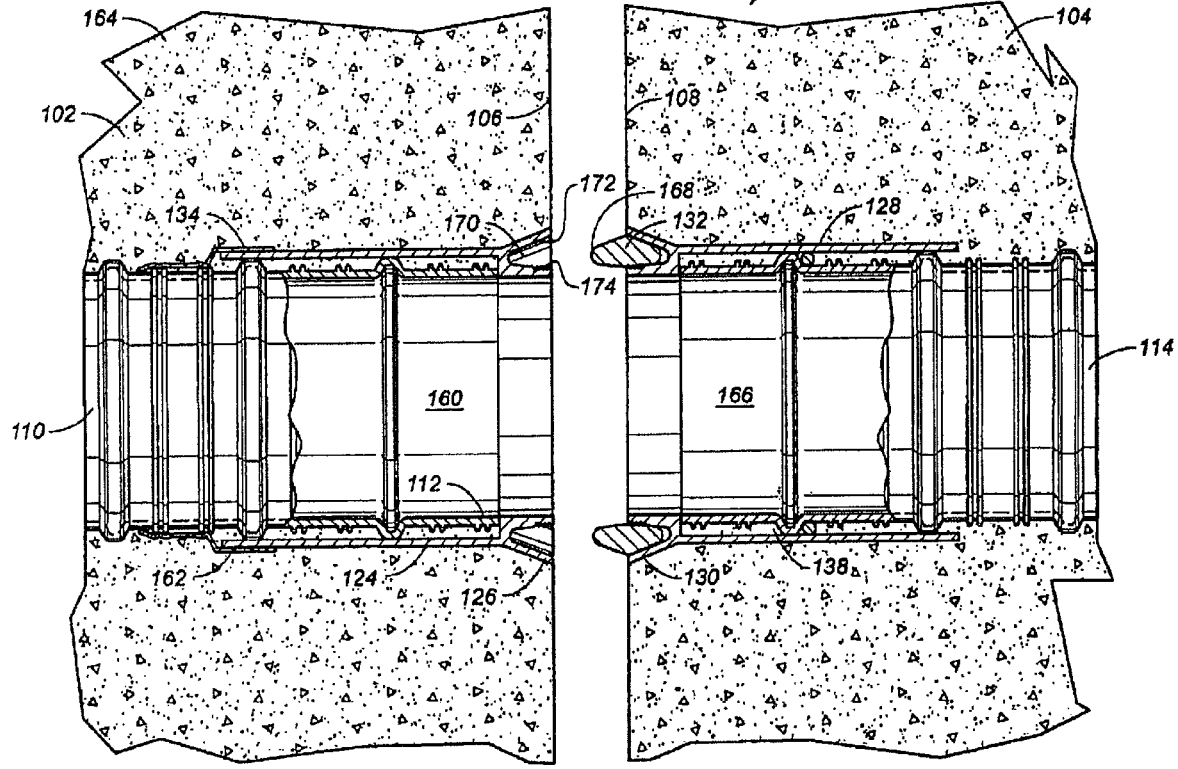

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4 and 22 are cancelled.

Claims 1, 3, 5, 7, 16, 18 and 23 are determined to be patentable as amended.

Claims 8, 9, 17 and 24, dependent on an amended claim, are determined to be patentable.

Claims 2, 6, 10-15 and 19-21 were not reexamined.

1. A coupler apparatus for use with concrete segments comprising:
   a first duct having an end and an exterior surface;
   a first coupler member extending over and around said exterior surface of said duct, said first coupler member having an end opening adjacent said and of said first duct;
   a second duct having an end and an exterior space;
   a second coupler member extending over and around said exterior surface of said second duct, said second coupler member having an end opening adjacent said end of said second duct;
   [a gasket means] *an elastomeric gasket* received in said end of said first coupler member and said end of said second coupler member, said [gasket means for preventing] *elastomeric gasket being deformable so as to prevent a* liquid from passing between [said] ends of said first and second coupler members into an interior of either of said first and second ducts; [and]
   an external seal affixed in generally liquid-tight relationship to an opposite end of said first coupler member and affixed to an exterior surface of said first duct[.]*;* and another seal positioned on said second duct and said second coupler member so as to maintain a liquid-tight relationship therebetween during relative axial movement between said second duct and said second coupler member.

3. A coupler apparatus for use with concrete segments comprising:
   a first duct having an end and an exterior surface;
   a first coupler member extending over and around said exterior surface of said duct, said first coupler member having an end opening adjacent said end of said first duct;
   a second duct having an end and an exterior surface;
   a second coupler member extending over and around said exterior surface of said second duct, said second coupler member having an end opening adjacent said end of said second duct, *said second coupler member being axially moveable relative to said second duct;*
   [a] *an annular elastomeric* gasket [means] received in said end of said first coupler member and *in* said end of said second coupler member, said *annular elastomeric* gasket [means for preventing] *being deformable so as to prevent* liquid from passing between said ends of said first and second coupler members into an interior of either of said first and second ducts; and
   an internal seal interposed in a generally liquid-tight relationship between an interior surface of said second coupler member and said exterior surface of said second duct[.] *so as to maintain a liquid-tight relationship therebetween during relative axial movement between said second duct and said second coupler member.*

5. The coupler apparatus of claim 3, said end of said first coupler member having a generally V-shaped groove facing said second coupler member, said second coupler member having a generally V-shaped groove facing said first coupler member, said *elastomeric* gasket [means] fitted in the V-shaped groove of at least one of said first and second coupler members.

7. The coupler apparatus of claim 5, said [gasket means] *annular elastomeric gasket* being an elastomeric ring having a cross-sectional thickness greater than a depth of either of the V-shaped grooves of said first and second coupler members.

16. An apparatus comprising:
   a first concerete segment having an outer surface;
   a first duct embedded in said first concrete segment and extending therethrough, said first duct having an end adjacent to said outer surface of said first concrete segment;
   a first coupler member embedded in said first concrete segment and extending over the first duct, said first coupler member having an end opening at said outer surface of said first concrete segment;
   a second concrete surface having an inner surface;
   a second duct embedded in said second concrete segment and extending therethrough, said second duct having an end adjacent said inner surface of said second concrete segment;
   a second coupler member embedded in said second concrete segment and extending over said second duct, said coupler member having an end opening at said inner surface of said second concrete segment, *said second coupler member being longitudinally axially moveable relative to said second duct;* [and
   [a] *an elastomeric* gasket received in said ends of said first and second coupler members, *said elastomeric gasket positioned so as to prevent liquid from passing between said ends of said first and second coupler members and into an interior of said first and second ducts during an entire range of the longitudinal axial movement of said second coupler member with respect to said second duct; and*
   *a plurality of tendons extending through the interior of said first and second ducts.*

18. The apparatus of claim 16, [further] *said seal* comprising:
   an internal seal interposed in generally liquid-tight relationship between an interior surface of said second coupler member and against an exterior surface of said second duct, [said internal seal allowing relative movement between said second coupler member and said second duct while maintaining the liquid-tight relationship therebetween].

23. The apparatus of claim [22] *19*, further comprising:
   a grout material filling said interior of said first and second ducts around said plurality of tendons therein.

* * * * *